United States Patent
Orlov et al.

(10) Patent No.: US 10,425,122 B1
(45) Date of Patent: Sep. 24, 2019

(54) SYSTEM-ON-A-CHIP FOR RECEPTION OF TELEMETRY MESSAGES OVER A RADIO FREQUENCY CHANNEL

(71) Applicant: Waviot Integrated Systems LLC, Watertown, SD (US)

(72) Inventors: Andrey Olegovich Orlov, Moscow (RU); Vasiliy Vasilievich Anisimov, Moscow (RU); Alexey Andreevich Danilov, Nizhny Novgorod (RU); Andrei Viktorovich Bakumenko, Lubertsi (RU); Danylo Sergeevich Batura, Mytishchi (RU)

(73) Assignee: WAVIOT INTEGRATED SYSTEMS, LLC, Watertown, SD (US)

( * ) Notice: Subject to any disclaimer, the term of this patent is extended or adjusted under 35 U.S.C. 154(b) by 0 days.

(21) Appl. No.: 16/429,729

(22) Filed: Jun. 3, 2019

Related U.S. Application Data

(63) Continuation of application No. 16/105,706, filed on Aug. 20, 2018, which is a continuation-in-part of
(Continued)

(51) Int. Cl.
| | |
|---|---|
| *H04B 1/707* | (2011.01) |
| *H04L 27/227* | (2006.01) |
| *H04L 27/233* | (2006.01) |

(52) U.S. Cl.
CPC ......... *H04B 1/707* (2013.01); *H04L 27/2273* (2013.01); *H04B 2201/70716* (2013.01); *H04B 2201/70728* (2013.01); *H04L 27/2335* (2013.01)

(58) Field of Classification Search
CPC .......... H04B 1/707; H04B 2201/70716; H04B 2201/70728; H04L 27/2273; H04L 27/2335
(Continued)

(56) References Cited

U.S. PATENT DOCUMENTS

| | | | |
|---|---|---|---|
| 5,668,837 | A | 9/1997 | Dent |
| 5,960,040 | A | 9/1999 | Cai et al. |

(Continued)

FOREIGN PATENT DOCUMENTS

| | | |
|---|---|---|
| CN | 106100790 A | 11/2016 |
| CN | 106341876 A | 1/2017 |

(Continued)

OTHER PUBLICATIONS

Kerlink, Wirnet Station, Embedded Base Station Controller and Radio Network Controller, for remote operations, retrieved from https://www.kerlink.com/product/wirnet-station/ on Sep. 13, 2018.
(Continued)

*Primary Examiner* — Wednel Cadeau
(74) *Attorney, Agent, or Firm* — BCF LLP

(57) ABSTRACT

A System-on-a-Chip (SoC) for receiving telemetry messages over a radio-frequency (RF) channel is provided. The SoC comprises at least one RF module; at least one module for conversion of the signal from an analog form to a digital form; at least one input signal digital processing unit for filtering the signal from the RF module; and at least one memory unit. The SoC also comprises at least one processor for executing time shifting and frequency shifting of the signal. The processor is configured to process each time- and frequency-shifted signal by consecutive Fourier transforms, such that a first time element of each next transform is placed immediately after a last element of a previous transform. The processor is also configured to receive the signal, which signal was subjected to a carrier frequency change during transmission thereof, the signal having transmission frequencies that are within at least two processed spectrum sections.

9 Claims, 4 Drawing Sheets

Related U.S. Application Data application No. 15/858,760, filed on Dec. 29, 2017, now Pat. No. 10,257,009.

(60) Provisional application No. 62/440,906, filed on Dec. 30, 2016.

(58) Field of Classification Search
USPC .......................................................... 375/340
See application file for complete search history.

(56) References Cited

U.S. PATENT DOCUMENTS

| | | | |
|---|---|---|---|
| 5,974,098 | A | 10/1999 | Tsuda |
| 6,115,728 | A | 9/2000 | Nakai et al. |
| 7,508,889 | B2 | 3/2009 | Liu |
| 8,156,209 | B1 | 4/2012 | Phadnis et al. |
| 9,049,732 | B2 | 6/2015 | Fourtet et al. |
| 9,252,998 | B2 | 2/2016 | Seely |
| 9,768,897 | B2 | 9/2017 | Artigue |
| 9,900,197 | B1 | 2/2018 | Rada et al. |
| 10,044,098 | B2 | 8/2018 | Ali |
| 2002/0085641 | A1* | 7/2002 | Baum .................. H04L 1/0009 375/260 |
| 2003/0224725 | A1 | 12/2003 | Limberg |
| 2004/0096021 | A1 | 5/2004 | Koval |
| 2005/0169407 | A1* | 8/2005 | Schrodinger ........ H03G 3/3052 375/343 |
| 2005/0188129 | A1 | 8/2005 | Abdelilah et al. |
| 2005/0237989 | A1 | 10/2005 | Ahn et al. |
| 2006/0094383 | A1 | 5/2006 | Zylowski |
| 2006/0133827 | A1 | 6/2006 | Becouarn et al. |
| 2006/0251190 | A1 | 11/2006 | Wang et al. |
| 2006/0285607 | A1 | 12/2006 | Strodtbeck et al. |
| 2007/0268980 | A1 | 11/2007 | Brannstorm et al. |
| 2007/0280098 | A1 | 12/2007 | Bhatt et al. |
| 2008/0151985 | A1 | 6/2008 | Chin et al. |
| 2008/0240285 | A1 | 10/2008 | Han et al. |
| 2011/0032620 | A1 | 2/2011 | Park et al. |
| 2011/0032920 | A1* | 2/2011 | Suberviola ........... H04B 1/7075 370/342 |
| 2011/0289156 | A1 | 11/2011 | Pirnazar |
| 2012/0014488 | A1 | 1/2012 | Liu et al. |
| 2012/0051287 | A1 | 3/2012 | Merlin et al. |
| 2012/0079155 | A1 | 3/2012 | Damodaran et al. |
| 2012/0195184 | A1 | 8/2012 | Dapper et al. |
| 2013/0170464 | A1 | 7/2013 | Hwang et al. |
| 2013/0202068 | A1 | 8/2013 | Ly-Gagnon et al. |
| 2015/0092753 | A1 | 4/2015 | Gupta et al. |
| 2016/0119184 | A1 | 4/2016 | Soriaga et al. |
| 2016/0132451 | A1 | 5/2016 | Cho et al. |
| 2016/0335897 | A1 | 11/2016 | Naserian et al. |
| 2016/0373138 | A1 | 12/2016 | Li et al. |
| 2017/0139053 | A1 | 5/2017 | Vishin et al. |
| 2017/0171841 | A1 | 6/2017 | Chen et al. |
| 2018/0191540 | A1 | 7/2018 | Chalbos et al. |

FOREIGN PATENT DOCUMENTS

| | | |
|---|---|---|
| CN | 107135554 A | 9/2017 |
| ES | 2707611 T3 | 4/2019 |
| WO | 2012027880 A1 | 3/2012 |
| WO | 2017197441 A1 | 11/2017 |
| WO | 2017210142 A1 | 12/2017 |
| WO | 2018109411 A1 | 6/2018 |

OTHER PUBLICATIONS

Sigfox Wireless Ethernet Gateway, retrieved from https://partners.sigfox.com/products/sigfox-wireless-ethernet-gateway, on Sep. 13, 2018.

Device—Wireless Gecko by Silicon Labs—information retrieved from https:/lwww.silabs.com/products/wireless/wireless-gecko-iot-connectivity-portfolio on Aug. 15, 2018.

Device—AX5043—Advanced High Performance ASK and FSK Narrow-band Transceiver for 27-1050 MHz Range, or Semiconductor, retrieved from https://lwww.onsemi.com/pub/Collateral/AX5043-D.PDF on Aug. 15, 2018.

Wenxu Zhang et al., "Application of FFT parallel code phase search algorithm in GNSS software" 2016 IEEE 13th International Conference on Signal Processing (ICSP). Online at https://ieeexplore.ieee.org/abstract/document/7878011/.

U.S. Appl. No. 16/105,706, filed Aug. 8, 2018.

International Search Report issued in respect of the International Patent Application PCT/US19/16750 dated May 8, 2019.

English translation of CN106100790 received together with the International Search Report in respect of the International Patent Application PCT/US19/16750 dated May 8, 2019.

Notice of Allowance dated Jun. 19, 2019 in respect of the U.S. Appl. No. 16/105,706.

\* cited by examiner

SYSTEM-ON-A-CHIP FOR RECEPTION OF TELEMETRY MESSAGES OVER A RADIO FREQUENCY CHANNEL

FIELD OF THE TECHNOLOGY

The present technology relates to computing equipment in general and, more particularly, to Systems-on-Chip receivers for wireless data transmission in low-power wide-area networks (LPWAN).

BACKGROUND OF THE TECHNOLOGY

Nowadays, when narrow-band radio signals are used in low-power wide-area networks (LPWAN), with the signal bandwidth of 500 Hz and less, an inaccuracy in generating carrier frequency by frequency synthesizers may result in occurrence of problems associated with misalignment of the frequencies of the transmitter and the receiver. For narrow-band radio signals transmitted from a subscriber device to the hub, this problem can be resolved by processing, by the hub, of a wide frequency band which is a priori larger than any misalignment of the frequencies of the transmitter of the subscriber device and the receiver of the hub. In the reverse direction from the hub to the subscriber device, radio signals are, as a general rule, received using off-the-shelf transceivers that process a narrow signal band which corresponds to the band of the expected signal without taking into account any possible discrepancies of the frequencies of the receiver and the transmitter. In this case, the carrier frequency of the signal in the radio signal should match exactly the passband of the input reception filters of the subscriber device for the successful reception of the radio signal. For example, for signals with a 200 Hz band, the alignment accuracy should be in the order of several tens of Hz.

There are known LPWAN standards, such as LoRa™ и SigFox™ standards. Devices that operate in accordance with the LoRa™ standard use signals with a spectrum extension. A drawback of that solution is a reduced spectral efficiency of the data network. To transmit messages from hubs to subscriber devices, SigFox™ uses signals with a sufficiently wide bandwidth. A drawback of that solution is a comparative reduction of the communication distance range during transmission from the hub to subscriber devices. Thus, the existing systems do not use a narrow-band modulation for downlink transmission of data.

SUMMARY

The systems and the methods described herein are aimed at eliminating the drawbacks inherent in the solutions known from the background.

One of the technical problems addressed by the non-limiting embodiments of the present technology comprises reception of messages, by a receiver from at least one transmitter, when messages are transmitted at least at one data rate. The reception of messages is carried out on a System-on-a-Chip (SoC), which receives a signal from a radio channel. In some implementations, the messages are with binary phase-shift keying (BPSK) or differential binary phase-shift keying (DBPSK) modulation, in which case no spread spectrum is used.

In at least some non-limiting embodiments of the present technology, the SoC is configured to receive messages from the radio air and is further configured to select digitally a message reception frequency from a set of predefined frequencies.

In at least some non-limiting embodiments of the present technology, a forward error correction coding is used to improve the quality of reception of messages by the receiver.

In at least some non-limiting embodiments of the present technology, the technology described herein permits receiving messages with a carrier frequency which is offset from the frequency expected by the receiver.

In at least some non-limiting embodiments, the receiver as described herein may receive messages that had their carrier frequency changed during the transmission of the messages from the transmitter. In at least some non-limiting embodiments, the reception of such messages may be performed if the set of predefined carrier frequencies used at the transmitter for transmission of the messages is known to the receiver.

In accordance with one aspect of the present disclosure, there is provided a System-on-a-Chip (SoC) for receiving telemetry messages over a radio-frequency (RF) channel. The SoC comprises: at least one RF module configured to receive a signal from a transmitting device antenna; the at least one RF module comprising: at least one frequency synthesizer, at least one frequency mixer, at least one low noise amplifier, and at least one RF filter.

The SoC further comprises at least one module for conversion of the signal from an analog form to a digital form, at least one input signal digital processing unit for filtering the signal from the RF module. The at least one input signal digital processing unit is configured to: identify, within the signal, at least two spectrum sections, and obtain, in each of the at least two spectrum sections, a low frequency signal by selecting a position of a central frequency of the each of the at least two spectrum section from the predetermined list of values.

The SoC further comprises at least one memory unit configured to store the signal and lists of positions of the central frequencies of processed spectrum sections and an indication of an order of use of the positions of the central frequencies; at least one processor for executing time and frequency shifting of the signal; and at least one communication interface for communication with a control device.

The at least one processor is configured to: time-shift the signal so that the values of time shifts occupy a length of one data bit; following the time-shift of the signal, frequency-shift the signal, the frequency shifting being independent of the time shifts so that the values of frequency shifts occupy a distance between the Fourier transform subcarriers; process each time- and frequency-shifted signal by consecutive Fourier transforms, such that a first time element of each next transform is placed immediately after a last element of a previous transform; receive the signal, which signal was subjected to a carrier frequency change during transmission thereof, the signal having transmission frequencies that are within the at least two spectrum sections processed, the at least one RF module having stored an indication of the transmission frequencies and the order of use thereof.

In at least one embodiment, the SoC further comprises at least one demodulator configured to demodulate all the received channels in the frequency domain independently of each other. In at least one embodiment, the SoC further comprises at least one additional memory storage configured to store Fourier transform results, and an interface configured to read those results from outside of the SoC.

In at least one embodiment, the SoC further comprises a module configured to estimate an input signal power. In at least one embodiment, the SoC further comprises a variable gain amplifier. In at least one embodiment, the SoC further comprises a quadrature demodulator. In at least one embodiment, the SoC further comprises a one-time programmable memory unit. In at least one embodiment, the SoC further comprises a digital signal processing blocks configured to process data. In at least one embodiment, the SoC further comprises an additional RF module configured to transmit the signal.

In accordance with one aspect of the present disclosure, there is provided a SoC for reception of telemetric information messages via a radio channel. In at least one embodiment, the SoC comprises at least one RF module made with the capability to receive a signal from the antenna, including at least one frequency synthesizer, at least one frequency mixer, at least one low noise amplifier, at least one RF filter; at least one module for conversion of the signal from the analog to digital form, at least one input signal digital processing unit which filters the signal from the RF module made with the capability to single out several spectrum sections from signal from the RF module from each other, obtaining a baseband signal in each such spectrum section, obtain a baseband signal of the spectrum section of the signal from the RF module, with the capability to select the position of the central frequency of the said section from the known list of values, at least one memory unit made with the capability to store the received signal and store lists of positions of the central frequencies of processed spectrum sections and the procedure for their use.

In at least one embodiment, the SoC also comprises at least one computer made with the capability to make shifts of the received signal by time and frequency, in which case the computer pre-shifts the signal by time so that the values of the shifts populate the length of one data bit; then the computer makes shifts of the signal by frequency which are independent of the time shifts so that the values of the shifts populate the distance between the Fourier transform subcarriers; process each signal obtained at the previous step by consecutive Fourier transforms, in which case the first time element of each next transform is placed immediately after the last element of the previous transform; receive the signal upon the transmission of which the carrier frequency was changed, in which case all the frequencies which were used during the transmission of the signal are within the spectrum sections processed by the input signal digital processing unit and the list of the used frequencies and the switch-over procedure are known to the receiver; at least one communication interface with the control device.

In at least one embodiment, the SoC may also comprise at least one demodulator made with the capability to demodulate all the obtained channels in the frequency domain independently of each other. In at least one embodiment, the SoC may also comprise at least one additional memory storage for storing Fourier transform results, and an interface to read those results from outside of the system.

In at least one embodiment, the SoC may also comprise a module to estimate the input signal power. In at least one embodiment, the SoC may also comprise a variable gain amplifier. In at least one embodiment, the SoC may also comprise a quadrature demodulator. In at least one embodiment, the SoC may also comprise a one-time programmable memory block. In at least one embodiment, the SoC may also comprise a digital signal processing blocks that process data to be transmitted. In at least one embodiment, the SoC may also comprise an additional RF module that is configured to transmit the signal.

BRIEF DESCRIPTION OF THE DRAWINGS

The features and advantages of the non-limiting embodiments of the present disclosure will become clear from the following detailed description and the appended drawings, in which.

DETAILED DESCRIPTION OF THE NON-LIMITING EMBODIMENTS

Figure 1:
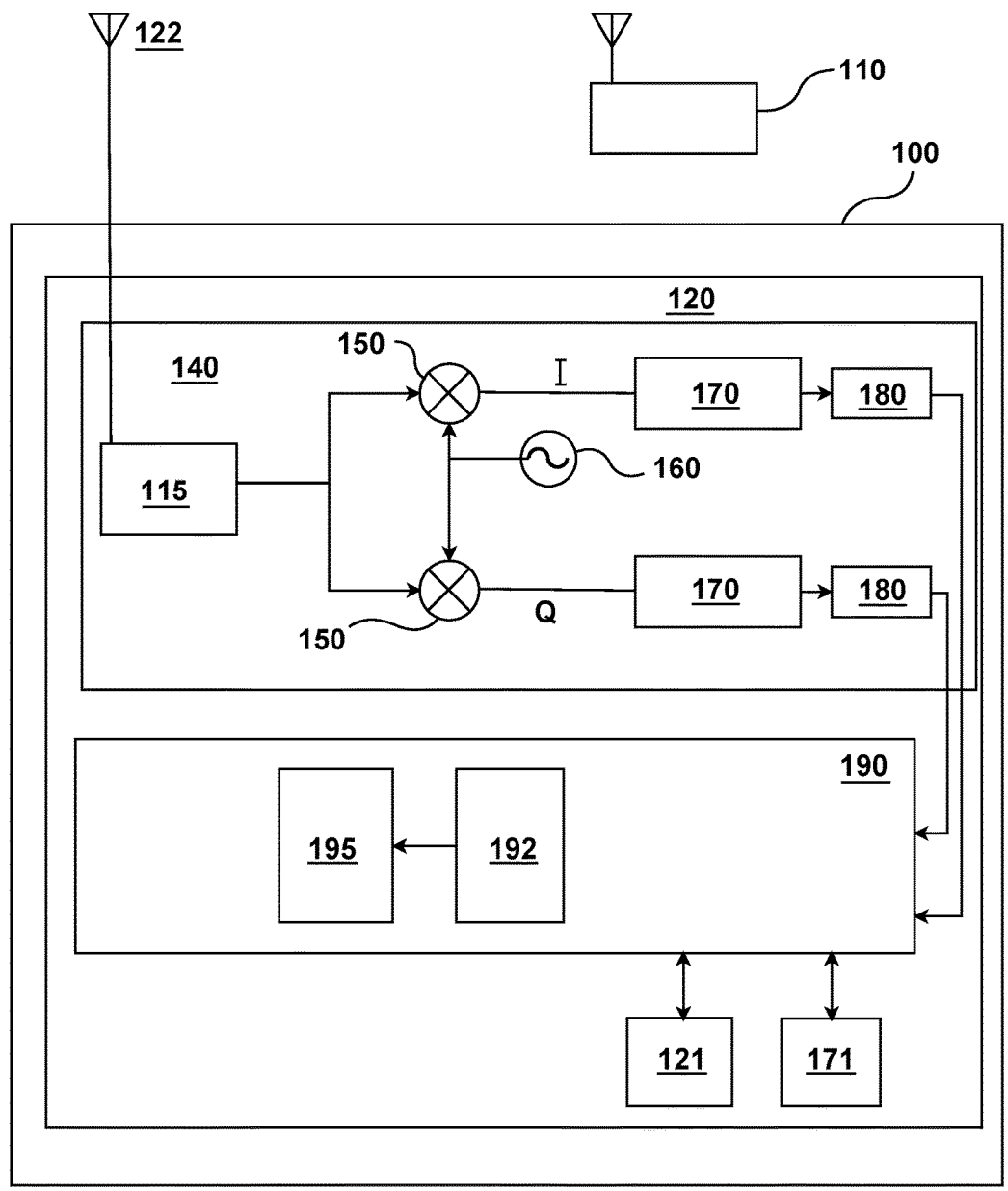
FIG. 1 depicts a transmitter and the SoC receiver for receiving LPWAN messages transmitted by the transmitter over an RF channel, in accordance with non-limiting embodiments of the present technology.

Non-limiting embodiments of the present technology can be implemented in a SoC in a form of a very large-scale integrated circuit or in a form of a multi-chip circuit in a system containing analog signal processing units, including, but not limited to: frequency synthesizer, low-pass filters, frequency mixer, amplifiers and/or low noise amplifiers, an analog-to-digital converter, digital-to-analog converter, digital signal processing units as well as interface modules with external devices.

Within the description provided herein below, a signal is a physical entity containing certain information.

Within the description provided herein below, a System-on-a-Chip (SoC) (as is generally known in microelectronics) is an electronic circuit performing functions of a single device (e.g., a computer or a radio receiver) and suitably arranged on a single chip.

Within the description provided herein below, an integrated (micro) circuit is a micro electronic device, an electronic circuit of random complexity (a chip) made on a semiconductor substrate (wafer or film) and placed in an undismountable body or having no body.

Within the description provided herein below, a very large-scale integrated circuit (VLSIC) is an integrated circuit (IC) which includes more than 10,000 elements in the chip.

Within the description provided herein below, a frequency synthesizer is a device for generation of electric harmonic oscillations using linear repetitions (multiplication, summation, subtraction) on the basis of one or more reference generators.

Within the description provided herein below, an electronic amplifier is a device configured to amplify electric power. A low noise amplifier is an electronic amplifier in which special measures have been taken to decrease the level of its own noises that can veil the amplified weak signal.

Within the description provided herein below, a digital-to-analog converter (DAC) is a device configured to convert a digital (usually binary) code into an analog signal (current, voltage or charge).

Within the description provided herein below, an analog-to-digital converter (ADC) is a device configured to convert an input analog signal into a discrete code (digital signal).

Within the description provided herein below, a low-pass filter (LPF) is an electronic or any other filter that is configured to a frequency signal spectrum below a certain frequency (cut-off frequency) to pass and suppresses the signal frequencies above that frequency.

Within the description provided herein below, a frequency mixer is an electric circuit that is configured to create a spectrum of combined frequencies when two or more signals of different frequencies are fed to it.

Within the description provided herein below, digital signal processing is signal processing methods based on numerical methods using digital computing equipment, for example, digital SoC units.

Within the description provided herein below, phase-shift keying (PSK) is one of the phase modulation types in which the carrier oscillation phase changes in a step-wise manner depending on the content of the message. The differential (relative) binary phase-shift keying (DBPSK) is the PSK in which information is coded by changing the phase between symbols.

Within the description provided herein below, checksum is a value calculated for a dataset by applying a certain algorithm and used to check the data integrity when the data is transmitted or stored.

Within the description provided herein below, cyclic redundancy code (CRC) is one of checksum determination algorithms designed to check the data integrity. It is calculated using the operation of division of polynomials over a finite field.

Within the description provided herein below, a digital filter is any filter which is configured to process a digital signal to single out and/or suppress certain frequencies of that signal.

Within the description provided herein below, decimation is a decrease in the sample rate of a time-discrete signal by decimation of its samples.

Within the description provided herein below, frequency response (FR) is a dependence of the amplitude of the output signal of a system on the frequency of its input harmonic signal.

Within the description provided herein below, bandwidth is a frequency range within which the frequency response of an acoustic, radio technical, optical or mechanical device is sufficiently even to cause a signal to be transmitted without a considerable distortion of its shape.

Within the description provided herein below, quadrature demodulation is the conversion of signals into a quadrature representation singling out the in-phase and quadrature components.

Within the description provided herein below, a Fourier transform is an operation which compares one function of a complex variable with another function of a complex variable and describes coefficients when the initial function is decomposed into elementary components, i.e. harmonic oscillations with various frequencies.

Within the description provided herein below, a discrete Fourier transform is an operation which converts a sequence of complex values of a function to a sequence of complex coefficients at elementary components, i.e. harmonic functions.

Within the description provided herein below, a fast Fourier transform (FFT) is an algorithm for calculation of a discrete Fourier transform (DFT).

Within the description provided herein below, a channel bandwidth capacity is a maximum data rate at which data can be transmitted without errors via a radio channel.

Within the description provided herein below, a bit rate is a volume of data in bits transmitted during a unit of time.

Within the description provided herein below, a clock pulse generator (clock frequency generator) is a device which generates electric pulses with a preset frequency which is used as a reference.

Within the description provided herein below, a sample rate is the rate of taking samples of a time-continuous signal during its sampling (in particular, by an analog-to-digital converter).

Within the description provided herein below, time resolution is a time interval determined at a fixed signal-to-noise ratio and equal to the minimal length of any of the two square irradiation pulses carried consecutively with the pulse/pause ratio equaling two and still perceived separately.

Within the description provided herein below, coherent reception is a signal reception method in which the reference oscillation is an exact copy of the transmitted signal. If the signal is an oscillation with a known frequency and phase, the coherent receiver uses a synchronous detector in which the reference oscillation is synchronous with the oscillation of the carrier frequency, taking into account the initial phase of the received signal. It is generally known that DBPSK allows for non-coherent detection, unlike BPSK. Therefore, in accordance with the non-limiting embodiments of the present technology, messages can be transmitted using DBPSK.

Within the description provided herein below, non-coherent reception is a signal reception method in which information on the initial phase of the received signal is not taken into account.

Within the description provided herein below, symbol synchronization is a synchronization using which a mismatch between the received and reference signals is eliminated with the accuracy of up to one symbol.

The non-limiting embodiments of the present technology are configured for use in data acquisition networks in telemetric systems in which a data volume of no more than 10-100 bytes (as an example) is required to be transmitted at a distance of not less than one kilometer. In particular, the non-limiting embodiments of the present technology may be used to transmit data representative of a status of any sensor, for example, a door opening sensor (in the IoT domain). The non-limiting embodiments of the present technology may be also used to transmit data representative of readings of any metering device, for example, a utility resource meter. Based on these features, the specific implementation examples presented below use transmission rates at which messages are transmitted at the bit rate of 50 bps, 100 bps, 400 bps, 3200 bps, without being so limited.

With reference to FIG. 1, there is depicted a receiver 100 (also referred to herein as a "receiving device 100"). The receiver 100 is configured to receive messages in a given bandwidth. For example, the bandwidth may be a non-licensed radio band such as, for example, 868.7 MHz to 869.2 MHz. This band may be non-licensed, as is the case in the Russian Federation. In the non-limiting embodiments of the present technology, a time of the beginning of transmission of each message is unknown and can vary.

A message is a block of data of ten bytes or more, the format of which is known to both a transmitting device 110 (also referred to herein as a "transmitter 110") and the SoC and the content of which allows the message to be detected and received by the receiver 100. The message contains a predefined bit sequence called a preamble which is used for initial searching for the message in the input signal and the data of the message itself.

In some non-limiting embodiments of the present technology, the message also contains additional service information, for example, a transmitted messages counter. In some non-limiting embodiments of the present technology, the message contains a checksum, a cyclic redundancy code or another set of additional data which is used to control the correctness of reception of the message. The message may also contain additional error control coding data which may be used to correct errors in the received message.

The receiving device 100 comprises SoC 120. The receiving device 100 also has RF signal processing units 140. SoC 120 comprises one or more RF processing units 140. An RF module is a set of units where signals are processed in the analog form, including on the radio frequency. The receiving device 100 may also contain other units, for example, a general-purpose computing device, other units driven by the purpose of the receiving device, such as, for example, units to control something or measure something. The receiving device 100 may also include an antenna 122 for direct reception and transmission of a radio signal to and from the air.

In some non-limiting embodiments of the present technology, a transmission frequency is selected from the set of frequencies known to the SoC 120 within the bandwidth of the SoC 120. In some non-limiting embodiments of the present technology, the message transmission frequency can be fixed for each device, or selected pseudo randomly from the set of known frequencies, or defined by an operator of the SoC 120.

In doing so, a selected frequency generation error on the transmitting device 110 side can be much more than both the message band and the frequency spectrum pitch (distance between the neighboring frequencies from the spectrum).

In some non-limiting embodiments of the present technology, a transmission frequency can be selected from the set of frequencies which are 20 KHz, 50 KHz, 80 KHz and so on, without limitation, away from the central frequency of the bandwidth of the receiving SoC 120, until such frequencies are within the bandwidth of the SoC 120.

In at least one embodiment, a message transmission frequency may be selected depending on a checksum. For example, on the checksum of a value of the message cyclic redundancy code.

The receiving device 100 does not have any exact information on the time and frequency of transmission of messages from transmitting device 110 because the accuracy of time and setting of the carrier frequency on the transmitting device 110 depends on the accuracy of the clock frequency generator, on the accuracy of the radio frequency generator, on the accuracy of the real time clock, on the specific technological process of manufacturing of the transmitting device 110 and its components, on the temperature of the environment and many other factors. Telemetric information acquisition systems do not often have a capability to compensate for all the listed factors on the transmitting device 110 side. Other system known from the background may, on the contrary, provide for such a compensation. For example, in cellular communications, the accuracy of setting the signal transmission time is achieved by synchronizing the customer phone clocks with the base station clocks. In some implementation versions of devices in other systems known from the background, the accurate time is also received from the satellite navigation system.

An example of implementation of non-limiting embodiments of the present technology is described herein using a sample bit rate of 50 bps.

FIG. 1 depicts a SoC 120, in accordance with at least one non-limiting embodiment. The SoC 120 is configured to receive signals from the radio air and subsequently processing them.

Figure 2:
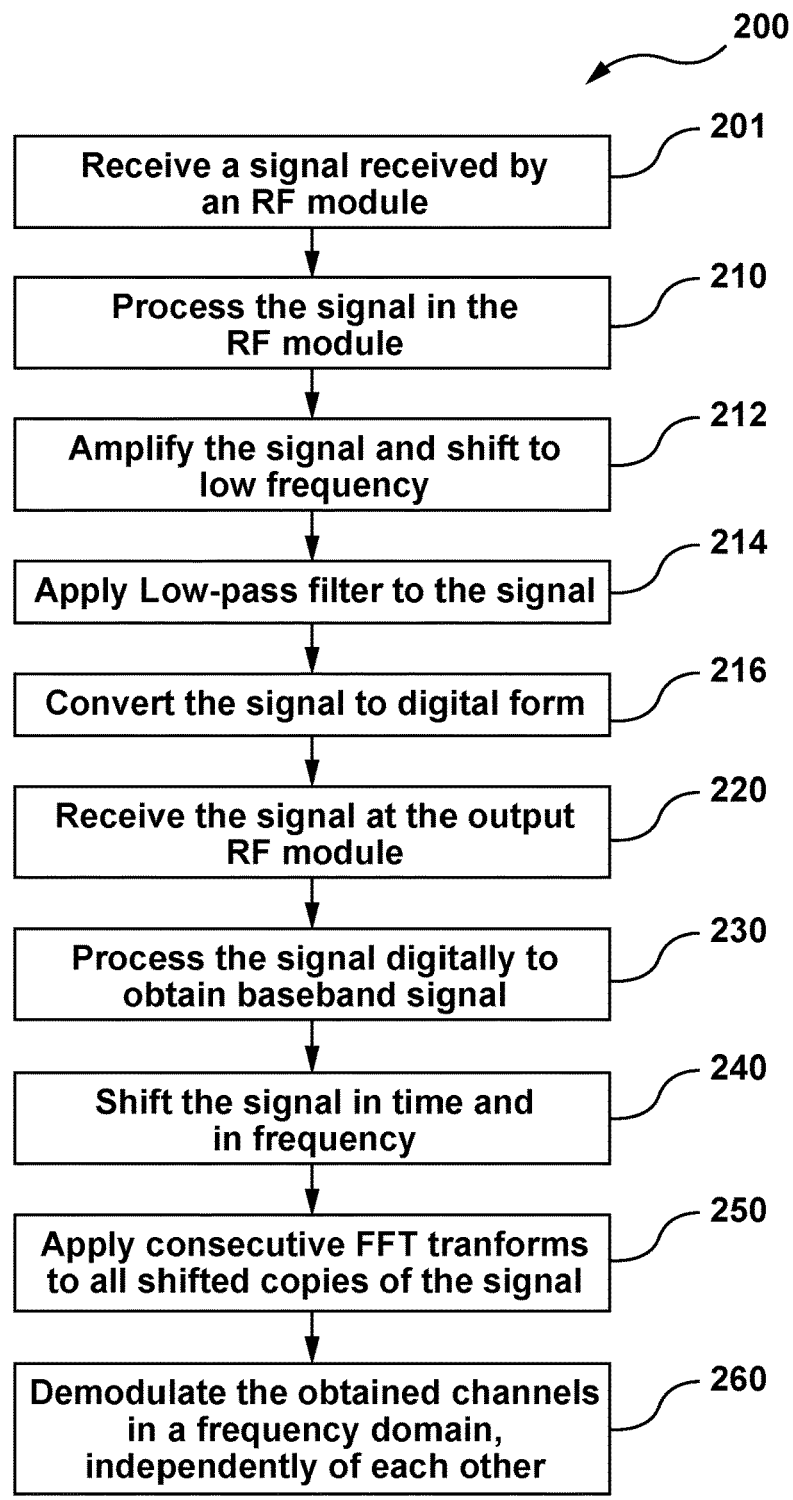
FIG. 2 depicts a flow chart of a method of reception of the RF messages using the SoC receiver of FIG. 1, the method implemented in accordance with non-limiting embodiments of the present technology.

FIG. 2 depicts a flow chart of a method 200 of reception of telemetric information messages via a radio channel, in accordance with at least one non-limiting embodiment. The method 200 is described in greater detail below as consecutive computational steps.

At step 201, a signal is received at the input of the RF module 140.

At step 210, the signal is amplified using a low-noise amplifier 115.

Using a mixer 150, the signal is then translated to the lower frequency domain. In some non-limiting embodiments of the present technology, the mixer 150 uses only one signal from a frequency synthesizer 160. In some non-limiting embodiments of the present technology, the mixer 150 uses a signal from the frequency synthesizer 160 and its copy phase-shifted at 90 degrees and generates a quadrature representation of the signal at the output. The signal can then go to one or more LPF 170. The signal then goes to one (or, in case of a quadrature representation, two) ADC units 180. After the ADC unit (units), the signal goes to the output of the RF module 140.

At step 220 of method 200 illustrated in FIG. 2, the signal is received from the output of the input RF module 140.

The signal received from the RF module 140 may contain messages from one or more transmitting devices 110, or at a specific point of time may contain no signals from devices.

In at least one embodiment, the input RF module 140 is configured to connect to the receiving antenna 122, amplify the signal received from the antenna 122, perform analog filtration of the signal using LPF 170, perform synthesis of the reference frequency; translate the signal to the lower frequency domain for subsequent digital processing, and perform an analog-to-digital conversion of the signal.

In some embodiments, the RF module 140 performs a quadrature demodulation of the signal.

In some embodiments, the RF module 140 also contains a signal strength estimation module.

In some embodiments, the RF module 140 also contains a variable gain amplifier.

In some embodiments, the RF module 140 is also configured to ensure transmission of the radio signal. In such case, the RF module 140 may perform one or more of the following functions operations: digital-to-analog conversion (using the DAC), synthesis of radio frequency (using the frequency synthesizer), quadrature modulation (using a modulator), direct BPSK modulation using the radio signal phase rotation, signal amplification, analog filtration of the signal, transmission of the signal to the transmitting antenna.

In some embodiments, the SoC 120 contains analog units that fulfill the functions of the RF module and perform amplification (for example, a low noise amplifier 115), filtration and quadrature demodulation of the radio signal as well analog-to-digital conversion. In other implementation versions, the RF module 140 is contained in a common package with the SoC 120.

In some embodiments, the SoC 120 contains two different RF modules 140: one for reception and the other one for transmission of signals.

In some embodiments, the SoC 120 contains digital signal processing units which are used for processing of the transmitted data.

In some embodiments, the signal is transmitted using BPSK modulation.

At step 230 of method 200 illustrated in FIG. 2, the input signal is filtered and frequencies are translated to render at least one low frequency signal from one of the spectrum sections of the input signal coming from the RF module 140.

In some non-limiting embodiments of the present technology, a series of frequency translations and filtration operations is carried out in the SoC 120 to obtain low frequency signals from several spectrum sections.

For example, in some non-limiting embodiments of the present technology, low frequency signals are obtained simultaneously from the spectrum sections at the distance of +20 KHz and −20 KHz from the center of the bandwidth of the RF module 140 of the SoC 120. Messages are transmitted with a switch-over of the transmitter between those spectrum sections and are received using two low frequency signals. The switch-over scheme is known to both the transmitter 110 and the receiver 100. In some non-limiting embodiments of the present technology, the switch-over scheme may be stored in the memory as a list of numerals corresponding to the time intervals, after the lapse of which from the beginning of the transmission of the message the frequency should be switched.

In some embodiments, the SoC 120 comprises additional units for digital signal processing of the input signal, such as, for example, additional LPF, and other units. FIG. 1 depicts an input signal digital processing unit 171 configured to filter the signal received from the RF module. In at least one embodiment, the input signal digital processing unit 171 is configured to identify, within the signal, at least two spectrum sections, and obtain, in each of the at least two spectrum sections, a low frequency signal by selecting a position of a central frequency of each of the at least two spectrum section from the pre-determined list of values.

At step 240 of method 200 illustrated in FIG. 2, the received signal is shifted in time and in frequency.

At the next operation step, the signal obtained at the previous steps is shifted in time and in frequency by a processor 190.

The signal is first time-shifted, so that the values of the shifts populate evenly the length of one data bit.

The signal is then frequency-shifted so that the values of the shifts occupy evenly the distance between the Fourier transform subcarriers which are applied to each result of the time-shifts independently.

At step 250 of method 200 illustrated in FIG. 2, the signal obtained at step 240 is processed using consecutive Fourier transforms, in which case the first element of each subsequent transform immediately follows the last element of the previous transform.

The processor 190 consecutively performs a series of Fourier transforms of order N of the input signal. The first series of transforms is performed by the processor 190 with the data arriving with the sample rate $F_{input}$ from the time point t0 (the solid line 310 in FIG. 3) and the next ones from the time point t1 (the dashed line 320 in FIG. 3, an additional frequency shift is also shown), and so on. Let's say that a channel in the frequency domain is a number of complex coefficients at one of the harmonics on the Fourier transform output obtained as a result of the series of consecutive Fourier transforms, with a defined time shift of the first transform in the series and with a common frequency shift. N frequency channels will be obtained as a result of each series of transforms.

For example, a flow with the sample rate $F_{input}$=51 200 Hz arrives at the input of the processor 190, and then the fast Fourier transform with N=1024 is performed and 1024 channels with the sample rate of 50 Hz are obtained. The data will be transmitted in these 1024 channels with the data rate of 1/N of the input data rate. If Fourier transforms with N=16 are performed in this case, 16 channels with the sample rate of 3200 Hz are obtained. The information in the obtained channels in the frequency domain will be contained in complex coefficients with respective harmonics on the output of a Fourier transform unit 192.

Fourier transforms allow for translating to the zero frequency domain all frequencies f0, f1 . . . fN that correspond to N Fourier transform subcarriers. In this case, the filtration is performed simultaneously when summation in the Fourier transform is carried out.

The time length of a block supplied to the Fourier transform unit is selected to coincide with the bit length. Let's consider one channel in the frequency domain. In case of a perfect bit synchronization, i.e. in case of a coincidence of the beginning and the end of the data blocks, which are supplied for a Fourier transform, and the actual beginning and end of the transmitted bits, each coefficient for a harmonic after the Fourier transform will include information about only one bit and, simultaneously, the information about each bit will be contained only in one coefficient.

Such a selection of Fourier transform parameters allows, in case of a bit synchronization close to the perfect one, for using the data in the frequency channels at once to detect messages in the input signal and demodulate data. In doing so, such a sequence allows for using the whole input band but, as can be easily noted, it does not ensure the accuracy of the time synchronization in one selected channel. In one selected channel, there is no capability of reception if the beginning and end of the bits in the air fail to coincide with the beginning and end of the Fourier transforms. An expert in the art would know that at least four digits per symbol are required to carry out bit synchronization (a symbol is one bit in the specific implementation example). For example, in orthogonal frequency-division multiplexing (OFDM)-based systems, the time synchronization resolution is, as a rule, one cycle of the general synchronization frequency for the whole bandwidth.

In order to improve the time resolution of the scheme, the method uses all the series of Fourier transforms (solid line 310, dashed line 320 and dash-dotted line 330 in FIG. 3 and other series not shown in FIG. 3), the initial time points t0 of which (transform series) are shifted relatively to each other within the bit length. The lengths of the Fourier transforms in this case remain equal to the bit length. Thus, the time resolution is not improved for searching for time synchronization after the Fourier transform unit in each separate series of transforms. In turn, several series of transforms are used which improves the general quality of the bit synchronization of the system.

Similarly, the frequency resolution of the receiver is improved using frequency shifts of the input signal because the resolution of one Fourier transform unit is limited to the distance between its subcarriers.

Figure 3:
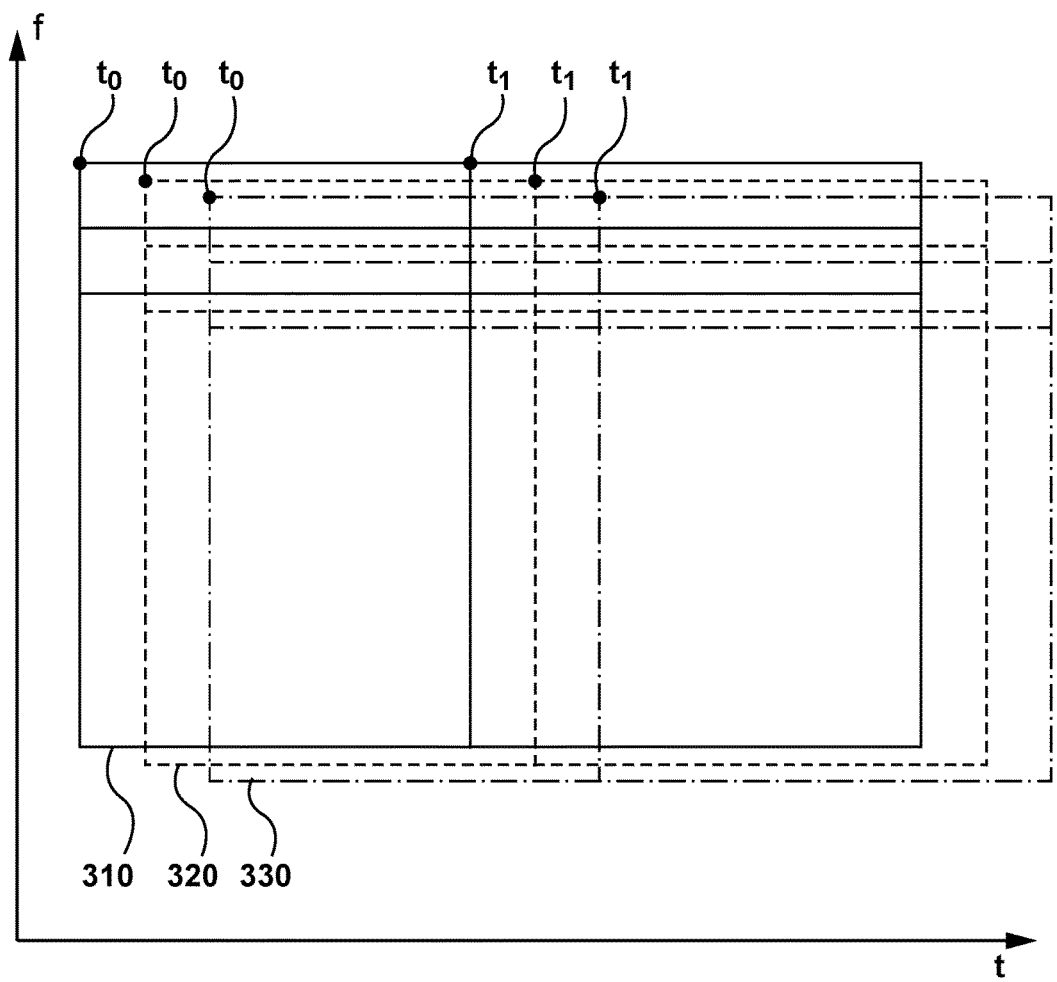
FIG. 3 schematically illustrates shifting of a low frequency signal in time and frequency implemented within the SoC receiver of FIG. 1, in accordance with at least some non-limiting embodiments of the present technology.

Purely for the purposes of ease of illustration and understanding, FIG. 3 does not show other versions of transform series, in particular those time-shifted (relatively to those shown) in all possible versions.

All the described operations, including time-shifting and frequency-shifting of the signal are made by the processor 190 in real time, irrespective of whether or not there are messages received.

Figure 4:
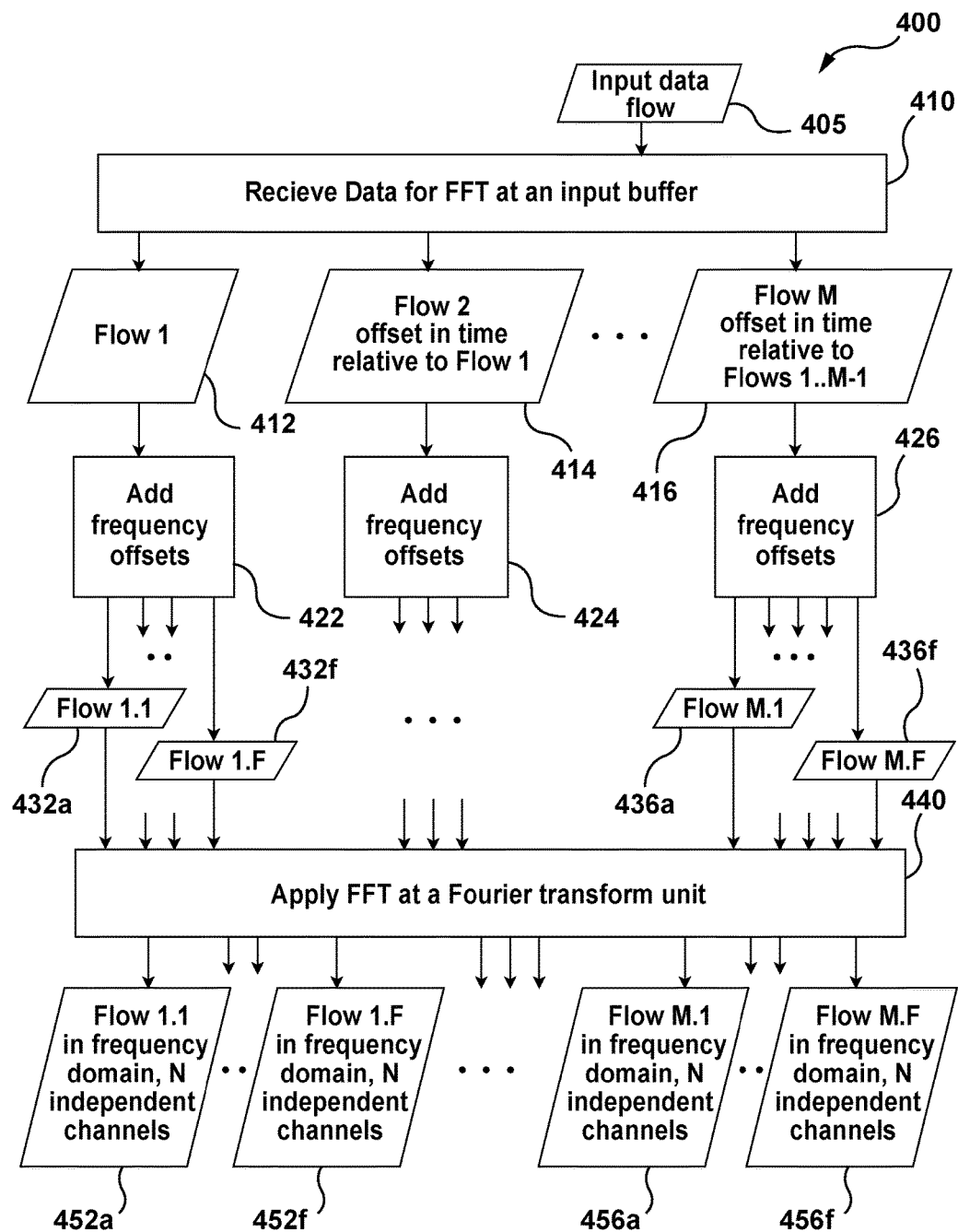
FIG. 4 schematically depicts a flowchart of a method for obtaining of samples in the frequency domain, in accordance with at least some non-limiting embodiments of the present technology.

FIG. 4 schematically depicts a flowchart of a method for obtaining samples in the frequency domain, in accordance with at least some non-limiting embodiments of the present technology.

The input data flow 405 is received 410 by an input buffer from the RF module 140 or from digital signal processing units P with the sample rate $F_{input}$. The input buffer is a memory unit sufficient to store N time samples. M parallel coinciding data flows (flow 1 412, flow 2 414, . . . flow M 416 in FIG. 4) leave the input buffer 410, and the data flows 412, 414, 416 differ by the labels of the beginning and end of a data block for the next Fourier Transform Unit.

Let's assume that the input flow 405 arrives at the data rate of, for example, 51200 Hz, and samples are recorded to the input buffer. Samples 1 to 1024 form the first block in the first series of Fourier transforms, and the next block in this series will contain samples 1025 to 2048, and so on. It can be seen that the probability that the next message bit will begin near the beginning of the next block is sufficiently low. For example, a bit can begin with sample 512 and then one half of the bit will be within the first block and the second half will be within the second block. It will lead to a situation that it will not be possible to receive the message further on. This situation cannot be corrected within one series of Fourier transforms because the transform length should coincide with the bit length so that, in case of a good bit synchronization one can use Fourier transform results to detect and receive the signal.

In this connection, additional series of Fourier transforms are performed: the second one from sample 257 to sample 1280, then from 1281 to 2304, etc. This series will be shifted relatively to the first one by 256 samples, which is one fourth of the bit length. There are similarly two more series, from 513 to 1536 and then from 1537 to sample 2560 and so on with a shift by one-half of the bit length relatively to the first series, and the fourth series from 769 to 1972 and so on with a shift by three fourth of the bit length. The first block of the next series added similarly will be the second block of the first series and then the fifth series will coincide with the first one.

If, for example, a bit began near sample 500, it means that it began close to the beginning of the third series of the shifts, and hence inside the block from 512 to 1536 the samples will largely belong to the same bit, same as all the blocks in that series.

It can be seen that, in the worst case, a bit can begin between the beginnings of the neighboring blocks, for example, near sample 128. Then such a bit will overlap with both block 1-1024 and block 256-1280 at the $7/8^{th}$ of its length, which allows for receiving the signal in one of these cases (or even in both).

In some embodiments, the distance between Fourier transform subcarriers may be 50 Hz. The signal bandwidth may be approximately equal to 70 Hz. As the exact frequency of the received signal is unknown, there can be a situation when the center of the bandwidth of the received signal will be between the Fourier transform subcarriers.

The situation with time synchronization is similar, it is better when the center of the bandwidth of the received signal is closer to one of the Fourier transform subcarriers.

In order to add new frequency positions of subcarriers, each data flow arrives at the frequency shift addition unit which is also in the system-on-a-chip. Each shift, as was said before, is less than the distance between the subcarriers of the Fourier transform unit and serves to increase the dimensionality of the Fourier transform unit. All M flows are frequency-shifted by F shifts (including the shift by 0 Hz, i.e. no shift). Thus, the data with M*F versions of shifts by frequency and time (flows 432a, . . . 432f, . . . 436a, . . . , 436f) are received at the Fourier transform unit.

To do so, the input data is frequency-shifted at steps 422, 424, 426 similarly to the time-shifts so that the obtained shifts populate evenly the space between the subcarriers of one Fourier transform.

For example, in case of the distance of 50 Hz between the Fourier subcarriers, the shifts are made by the frequency of +16 Hz and +33 Hz (which is the same as by −16 Hz with the accuracy to the neighboring subcarriers), so the spectrum of the Fourier transform subcarriers for the whole SoC 120 will expand. Frequencies +−16 Hz, +−32 Hz, +−66 Hz, etc. will be added to the frequencies 0 Hz, +−50 Hz, +−100 Hz, etc.

M*F independent parallel data channels (data flows 432a, . . . , 432f, . . . , 436a, . . . , 436f in FIG. 4), with all possible frequency shifts and with all time shifts, are received 440 at the input of the Fourier transform unit. Accordingly, there are N channels at the output of each Fourier transform unit, providing M*N*F data flows in total (data flows 452a, . . . , 452f, . . . , 456a, . . . , 456f in FIG. 4).

At step 260 of method 200 illustrated in FIG. 2, all the obtained channels in the frequency domain are demodulated independently of each other.

At step 260, conventional operations for message detection are performed on the data flows. For example, search for a message preamble, symbol synchronization, correction of errors, elimination of the channel influence, and other operations.

In doing so, all channels are demodulated independently of each other by a demodulator 195 without taking into account that messages in such channels can coincide by time and frequency. In some non-limiting embodiments of the present technology, messages are checked for integrity and correctness after demodulation by checking the checksum. For example, messages may be checked using the cyclic redundancy code transmitted within the message. The value of the code for the received message may be calculated and compared with the transmitted code value calculated on the transmitting device side. These values coincide for a correctly transmitted and received message.

In some non-limiting embodiments of the present technology, the demodulator 195 uses independently the in-phase and quadrature components for demodulation for each channel obtained in the frequency domain. For example, data can be received according to the component signs, in which case the positive value can correspond to the off-bit of data and the negative value can correspond to the on-bit, or vice versa. Conventional methods can be used to eliminate any uncertainty. In some non-limiting embodiments of the present technology, a preamble may be used to define the correspondence of the bits to the signs. In some non-limiting embodiments of the present technology, a checksum may be used to do so.

In some non-limiting embodiments of the present technology, the checksum which forms part of a message, for example, the cyclic redundancy code, is used to check the integrity of the received messages after demodulation.

Referring again to FIG. 1, SoC 120 for reception of telemetric information messages via a radio channel also comprises at least one processor 190.

The processor 190 is configured to executing time and frequency shifting of the signal. The processor 190 is configured to, firstly, time-shift the signal so that the values of the shifts occupy a length of one data bit. Secondly, the processor 190 is configured to frequency-shift the signal, the frequency-shifting being independent of the time shifts so that the values of the shifts occupy a distance between the Fourier transform subcarriers. The processor 190 is also configured to process each time and frequency shifted signal by consecutive Fourier transforms, such that a first time element of each next transform is placed immediately after a last element of a previous transform.

The processor 190 may also be configured to filter the signal using a lower frequency filter, translate frequencies and single out low frequency signals.

The processor 190 is configured to perform steps 201-260 of method 200 described above.

The processor 190 may be implemented both as a software and hardware as part of SoC. The processor 190 may comprise one or more digital signal processors (DSP) or neural network processors of various types. In some embodiments, the processor 190 may perform steps 201-260 in parallel.

The SoC 120 may also include a memory unit 121 comprising a data memory and a program memory. The program memory may store programs to manage the general operation of the SoC 120. The memory unit 121 may include an external memory, such as, for example, CompactFlash (CF) flash memory, Secure Digital (SD) flash memory, Micro-SD flash memory, Mini-SD flash memory, Extreme Digital (xD) flash memory, a memory card (of a digital camera) or alike. The memory unit 121 may also include a disk storage, such as a hard disk drive (HDD) or a solid-state drive (SSD).

The SoC 120 may also comprise antenna 122. The antenna 122 may be both a transmitting and receiving antenna connected with the RF module 140, in which case the antenna 122 includes one or more antenna elements. Alternatively or additionally, one or more of antennas 122 may be specifically dedicated receiving antennas or specifically dedicated transmitting antennas.

In some embodiments, the SoC 120 may be implemented on several chips forming a system in a package (SiP).

In some embodiments, the radio frequency receiving devices 100 and the transmitting devices 110 are made at least on one semiconductor chip. Such micro circuits fulfill various private functions of radio frequency conversions of the signal—amplification, attenuation, change of the central frequency, etc.

In some other embodiments, each radio frequency receiving device 100 is made on one semiconductor microchip, and each radio frequency transmitting device 110 is made on one semiconductor microchip. In such embodiments, microchips with a higher degree of integration are used, so that all the necessary functions of the receiving device 100 and transmitting device 110 are fulfilled by one microchip only (except for simple necessary external elements and a reference signal generator).

All the units used in the SoC 120 may be implemented using electronic components used to create digital integrated circuits and known to an expert in the art. In some embodiments, operation logic of the micro-circuits may be defined upon manufacturing or may be set by programming in order to implement the units of the SoC 120. Programmer software and debugging environments may be used for programming, allowing for setting the desired structure of the digital device as a principal electric circuit or a program in special hardware description languages, such as, for example, Verilog, VHDL, AHDL, and others.

Some parts of the description of the non-limiting embodiments of the present technology are represented as algorithms and symbolic presentation of operations with data bits in the memory of the chip. Such descriptions and presentations of the algorithms are means used by data processing experts to convey the essence of the technical solution to other experts in this area as efficiently as possible. In this document and on the whole, an algorithm means a sequence of computational operations leading to the required result. Operations require physical manipulations of physical values. Usually, although not mandatorily, these values take the shape of electric or magnetic signals that can be stored, transmitted, combined, compared and otherwise manipulated.

It should however be kept in mind that all these terms should be linked to respective physical values and that they are just convenient names applicable to those values. Unless otherwise specifically and unambiguously indicated in the claims, it should be taken that throughout the text the terms, such as "determination", "computation", "calculation", "reception", "setting", "modification", etc. relate to actions and processes of a computing device, for example, a system-on-a-chip, or a similar electronic computing device which handles data and converts data presented as physical (for example, electronic) values in the registers and memory of the computing device into other data similarly presented as physical values in the memory or registers of the computing device, or other similar data storage, transmission or display devices.

The non-limiting embodiments of the present technology can be made in other particular forms, within the structures, methods or other material characteristics of the technology in accordance with the detailed description given in this document and the following claims. The described implementation versions should be considered in all respect only as illustrative and non-restrictive.

The invention claimed is:

1. A System-on-a-Chip (SoC) for receiving telemetry messages over a radio-frequency (RF) channel, the SoC comprising:
    at least one RF module configured to receive a signal from a transmitting device antenna, the at least one RF module comprising:
        at least one frequency synthesizer,
        at least one frequency mixer,
        at least one low noise amplifier,
        at least one RF filter, and
        at least one module for conversion of the signal from an analog form to a digital form;
    at least one input signal digital processing unit for filtering the signal from the RF module, the at least one input signal digital processing unit being configured to:
        identify, within the signal, at least two spectrum sections, and
        obtain, in each of the at least two spectrum sections, a low frequency signal by selecting a position of a central frequency of the each of the at least two spectrum section from the pre-determined list of values;
    at least one memory unit configured to store the signal and lists of positions of the central frequencies of processed spectrum sections and an indication of an order of use of the positions of the central frequencies;
    at least one processor for executing time and frequency shifting of the signal, the at least one processor being configured to:
        time-shift the signal so that the values of time shifts occupy a length of one data bit;
        following the time-shift of the signal, frequency-shift the signal, the frequency shifting being independent of the time shifts so that the values of frequency shifts occupy a distance between the Fourier transform subcarriers;
        process each time- and frequency-shifted signal by consecutive Fourier transforms, such that a first time element of each next transform is placed immediately after a last element of a previous transform;

receive the signal, which signal was subjected to a carrier frequency change during transmission thereof, the signal having transmission frequencies that are within the at least two spectrum sections processed, the at least one RF module having stored an indication of the transmission frequencies and the order of use thereof; and at least one communication interface for communication with a control device.

2. The SoC according to claim 1, the SoC further comprising at least one demodulator configured to demodulate all the received channels in the frequency domain independently of each other.

3. The SoC according to claim 1, the SoC further comprising at least one additional memory storage configured to store Fourier transform results, and an interface configured to read those results from outside of the SoC.

4. The SoC according to claim 1, the SoC further comprising a module configured to estimate an input signal power.

5. The SoC according to claim 1, the SoC further comprising a variable gain amplifier.

6. The SoC according to claim 1, the SoC further comprising a quadrature demodulator.

7. The SoC according to claim 1, the SoC further comprising a one-time programmable memory unit.

8. The SoC according to claim 1, the SoC further comprising digital signal processing units configured to process data.

9. The SoC according to claim 1, the SoC further comprising an additional RF module configured to transmit the signal.

* * * * *